(12) United States Patent
Nakano

(10) Patent No.: US 8,290,361 B2
(45) Date of Patent: Oct. 16, 2012

(54) TRANSMISSION LINE MONITORING SYSTEM

(75) Inventor: Takehiro Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 458 days.

(21) Appl. No.: 12/491,709

(22) Filed: Jun. 25, 2009

(65) Prior Publication Data

US 2009/0324231 A1    Dec. 31, 2009

(30) Foreign Application Priority Data

Jun. 26, 2008  (JP) .................................. 2008-167334

(51) Int. Cl.
*H04B 10/08* (2006.01)
*H04B 17/00* (2006.01)

(52) U.S. Cl. .................. 398/9; 398/10; 398/13; 398/14; 398/16; 398/17; 398/20; 398/21; 398/83

(58) Field of Classification Search ........................ None
See application file for complete search history.

(56) References Cited

U.S. PATENT DOCUMENTS

| 6,327,060 B1 * | 12/2001 | Otani et al. ...................... 398/83 |
| 2002/0063921 A1 * | 5/2002 | Terahara et al. ............... 359/124 |
| 2005/0226620 A1 * | 10/2005 | Feuer et al. ...................... 398/83 |

FOREIGN PATENT DOCUMENTS

| JP | 1997289494 A | 11/1997 |
| JP | 1998256995 A | 9/1998 |

OTHER PUBLICATIONS

European Search Report for EP 09 16 3922 completed Sep. 24, 2009.

* cited by examiner

*Primary Examiner* — Kenneth N Vanderpuye
*Assistant Examiner* — Darren E Wolf

(57) ABSTRACT

In a transmission path monitoring system, a first add section adds a first add signal to a first wavelength division multiplexing signal. A first drop section separates a first drop signal from the first wavelength division multiplexing signal. A first loopback section transfers a monitor signal on a first drop optical transmission path onto a second add optical transmission path. A second add section adds a second add signal to a second wavelength division multiple signal. A second drop section separates a second drop signal from the second wavelength division multiplexing signal. A first communication section transmits the first add signal and the monitor signal and receive the second drop signal and the monitor signal.

8 Claims, 10 Drawing Sheets

TRANSMISSION LINE MONITORING SYSTEM

INCORPORATION BY REFERENCE

This patent application claims a priority on convention based on Japanese Patent Application No. 2008-167334 filed on Jun. 26, 2008. The disclosure thereof is incorporated herein by reference.

TECHNICAL FIELD

The present invention relates to a transmission path monitoring system for monitoring a transmission path, and particularly relates to a transmission path monitoring system for monitoring an optical fiber in a submarine cable.

BACKGROUND ART

FIG. 1 is a block diagram showing a communication system using a submarine cable in a conventional technique. In FIG. 1, an A station 100 and a B station 101, which are land optical transceiver stations, communicate with each other via optical fibers for transmission paths in the submarine cable. Each of the A station 100 and the B station 101 transmits or receives, as a main signal, a wavelength division multiplexing (WDM) signal $\lambda w$ of signals with a plurality of wavelengths different from each other. It is to be noted that a communication between the A station 100 and the B station is a "point-to-point communication".

The A station 100 can transmit a monitor signal $\lambda a$ as an optical signal used to monitor the transmission path from the A station 100 to the B station 101 (hereinafter, to be referred to as an "A ● B route") The B station 101 can transmit a monitor signal $\lambda b$ as an optical signal used to monitor the transmission path from the B station 101 to the A station 100 (hereinafter, to be referred to as a "B ● A route"). If a distance between the A station 100 and the B station 101 is long, repeaters for relaying the communication are arranged on the transmission paths between the A station 100 and the B station 101. The repeater includes an optical loopback circuit 1a, 2a, . . . , or na for looping back the monitor signals $\lambda a$ and $\lambda b$.

The monitor signal $\lambda a$ transmitted from the A station 100 to the A ● B route passes through the respective optical loopback circuits 1a, 2a, . . . , and na and arrives at the B station 101. Furthermore, each of the optical loopback circuits 1a, 2a, . . . , and na separates the monitor signal $\lambda a$ in a predetermined intensity ratio and loops back the monitor signal $\lambda a$ to the B ● A route. Each of the optical loopback circuits 1a, 2a, . . . , and na can also loop back reflected light and scattered light generated on the transmission path. It should be noted that the monitor signal $\lambda b$ transmitted from the B station 101 is looped back to the B station 101 by the similar process performed on the monitor signal $\lambda a$. The A station 100 and the B station 101 receive the monitor signals $\lambda a$ and $\lambda b$ looped back via the transmission paths, respectively.

Each of the A station 100 and the B station 101 analyzes an optical intensity level of the received monitor signal $\lambda a$ or $\lambda b$, time from transmission to reception of the monitor signal $\lambda a$ or $\lambda b$, signals superimposed on the received monitor signal $\lambda a$ or $\lambda b$, and the like, and monitors failures such as a reduction in a level of the repeater, an increase in an optical loss of the optical fiber and disconnection of the optical fiber. Each of the A station 100 and the B station 101 monitors whether or not the failure has occurred, a type of the failure and a location of occurrence of the failure. Furthermore, each of the A station 100 and the B station 101 can monitor a relation between an optical loss amount and a distance in detail by analyzing the reflected light and the scattered light in a transmission direction of the monitor signal $\lambda a$ or $\lambda b$ by using optical time domain reflectometry (OTDR).

Recently, a demand has risen for an adding/dropping technique to add or drop an optical signal to or from a WDM signal transmitted via an optical fiber in a submarine cable. If the adding/dropping is performed, it is necessary to monitor an add/drop transmission path for the added optical signal or dropped optical signal.

Examples of a technique for monitoring such an add/drop transmission path are known as a line monitoring apparatus disclosed in Japanese Patent Application Publication (JP-A-Heisei 9-289494: related art 1) and an optical line monitoring system disclosed in Japanese Patent Application Publication (JP-A-Heisei 10-256995: related art 2).

In the line monitoring apparatus disclosed in the related art 1, a waveform separating unit for adding or dropping an optical signal to or from a main signal is provided between a transmission side station and a reception side station. Furthermore, an add/drop station is provided in the line monitoring apparatus to transmit or receive the added or dropped optical signal. Moreover, an optical loopback circuit is provided on an add/drop transmission path between the wavelength separating unit and the add/drop station. The wavelength separating unit drops not only the main signal but also a monitor signal having a preset wavelength to the add/drop transmission path. The optical loopback circuit loops back the dropped monitor signal to the transmission side station that transmitted the monitor signal. The transmission side station receives the looped-back monitor signal, thereby making it possible to monitor the add/drop transmission path.

Moreover, in the optical line monitoring system disclosed in the related art 2, add/drop stations are provided between trunk stations that serve as transmission or reception side stations, to add or drop a wavelength signal to or from a main signal. Optical loopback circuits are provided between the trunk stations. At least one of the trunk stations and the add/drop stations is used as a monitoring station. A monitor signal transmitted from the monitoring station passes through the add/drop stations other than the monitoring station. The optical loopback circuit loops back the monitor signal to the monitoring station. The monitoring station receives the looped-back monitor signal and can thereby monitor a transmission path on which the monitor signal is transmitted.

In the optical line monitoring system disclosed in the related art 2 of the conventional examples, if one of the trunk stations is used as the monitoring station, then the monitor signal passes through the drop stations. Therefore, the monitor signal is not transmitted onto an add/drop transmission path. Thus, if one of the trunk stations is used as the monitoring station, the add/drop transmission path cannot be monitored. In order to monitor the add/drop transmission path, it is necessary to use one of the drop stations as the monitoring station.

The line monitoring apparatus disclosed in the related art 1 has the following problems. When a plurality of wavelength add/drop units are used, it is required to set wavelengths to be added or dropped for the respective wavelength separating units. Thus, as the number of wavelength add/drop units increases, the number of wavelengths used for monitor signals increases and a wavelength bandwidth available for a main signal decreases accordingly.

The optical line monitoring system disclosed in the related art 2 has the following problems. When a plurality of wavelength add/drop stations are present, an add/drop transmission path is provided for each add-drop station to transmit a signal to be added or dropped in each of the add/drop stations. In order to monitor each add/drop transmission path, it is necessary to use each add/drop station as the monitoring station.

Since the monitor signal passes through the add/drop stations other than the monitoring station that transmitted the monitor signal, the monitor signal transmitted from the monitoring station is not transmitted onto the add/drop transmission path provided in the add/drop stations other than the monitoring station. Thus, in order to monitor all the add/drop transmission paths, all the add/drop stations should be used as the monitoring stations. Further, the monitor signals transmitted from the monitoring stations must differ from each other in wavelength so that the monitoring station can pass through the monitor signals transmitted from the other monitoring stations.

As a result, similarly to the line monitoring apparatus disclosed in the related art 1, the optical line monitoring system disclosed in the related art 2 has the problems that the number of wavelengths used for the monitor signals increases as the number of the add/drop stations increases and that a wavelength bandwidth available for a main signal decreases.

SUMMARY

It is an object of the present invention to provide a transmission path monitoring system in which it is prevented that a wavelength band usable for a main signal decreases.

In an aspect of the present invention, a transmission path monitoring system includes: a first add section configured to add a first add signal transmitted on a first add optical transmission path, to a first wavelength division multiplexing signal transmitted on a first main optical transmission path, and allow a monitor signal to be transmitted on the first add optical transmission path; a first drop section configured to separate a first drop signal from the first wavelength division multiplexing signal transmitted on the first main optical transmission path onto a first drop optical transmission path, and allow the monitor signal transferred by the first add section to be transferred onto the first drop optical transmission path; a first loopback section configured to transfer a monitor signal transmitted on the first drop optical transmission path onto a second add optical transmission path; a second add section configured to add a second add signal transmitted on the second add optical transmission path to a second wavelength division multiple signal transmitted on a second main optical transmission path, and allow a monitor signal to be transmitted on the second add optical transmission path; a second drop section configured to separate a second drop signal from the second wavelength division multiplexing signal transmitted on the second main optical transmission path to transfer onto the second drop optical transmission path, and allow the monitor signal transferred by the second add section to be transmitted on the second drop optical transmission path; and a first communication section configured to transmit the first add signal and the monitor signal onto the first add optical transmission path and receive the second drop signal and the monitor signal transmitted on the second drop optical transmission path.

According to the present invention, a decrease in a wavelength band usable for a main signal can be suppressed.

BRIEF DESCRIPTION OF THE DRAWINGS

The above and other objects, advantages and features of the present invention will be more apparent from the following description of certain exemplary embodiments taken in conjunction with the accompanying drawings, in which.

EXEMPLARY EMBODIMENTS

Figure 1:
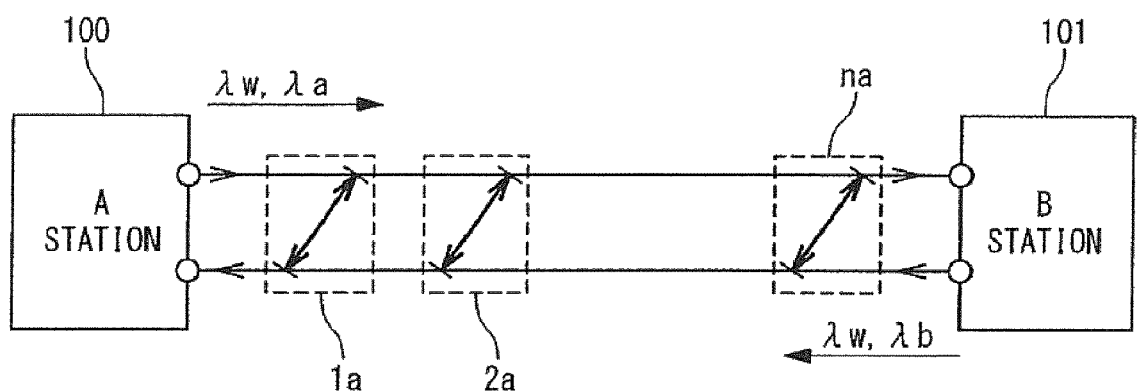
FIG. 1 is a block diagram showing a submarine cable using communication system according to a related technique.

Hereinafter, a communication system of the present invention will be described with reference to the attached drawings. In the following description, same components are assigned with same reference numerals or symbols, and accordingly, the description thereof is omitted.

[First Exemplary Embodiment]

Figure 2:
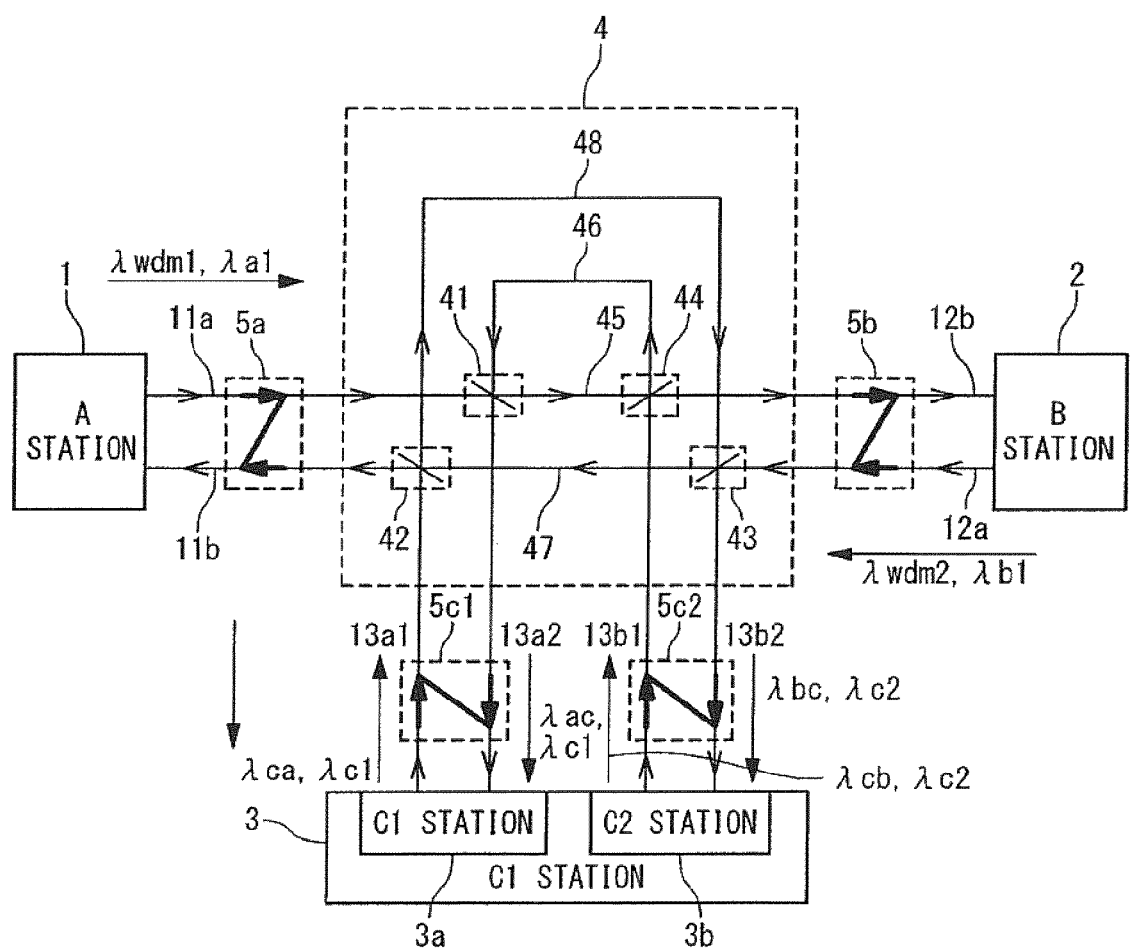
FIG. 2 is a block diagram showing a submarine cable using communication system according to a first exemplary embodiment of the present invention.

FIG. 2 is a block diagram showing the communication system using a submarine cable according to a first exemplary embodiment of the present invention. In FIG. 2, the communication system includes an A station 1, a B station 2, a C station 3 that includes a C1 station and a C2 station 3b, an optical separating/combining section 4 and optical loopback circuits 5a, 5b, 5c1 and 5c2.

The A station 1, the B station 2 and the C station 3 transmit or receive signals and are typically provided on land. The A station 1, the B station 2 and the C station 3 are connected to the optical separating/combining section 4 via an optical fibers for the transmission paths in the submarine cable, respectively. A pair of optical fibers are used to transmit or receive signals. It should be noted that a communication between the A station 1 and the B station 2 is a "point-to-point communication".

Specifically, the optical fiber connecting the A station 1 to the optical separating/combining section 4 includes an optical fiber 11a that transmits a signal from the A station 1 to the optical separating/combining section 4 and an optical fiber 11b that transmits a signal from the optical separating/combining section 4 to the A station 1. Also, the optical fiber connecting the B station 2 to the optical separating/combining section 4 is configured to include an optical fiber 12a that transmits a signal from the B station 2 to the optical separating/combining section 4 and an optical fiber 12b that transmits a signal from the optical separating/combining section 4 to the B station 2. Moreover, the optical fiber connecting the C1 station 3a to the optical separating/combining section 4 includes an optical fiber 13a1 that transmits a signal from the C1 station 3a to the optical separating/combining section 4 and an optical fiber 13a2 that transmits a signal from the optical separating/combining section 4 to the C1 station 3a. The optical fiber connecting the C2 station 3b to the optical separating/combining section 4 includes an optical fiber 13b1 that transmits a signal from the C2 station 3b to the optical separating/combining section 4 and an optical fiber 13b2 that transmits a signal from the optical separating/combining section 4 to the C2 station 3b.

The optical fiber 13a1 is an example of a first add transmission path, and the optical fiber 13b2 is an example of a first drop transmission path. The optical fiber 13b1 is an example of a second add transmission path, and the optical fiber 13a2 is an example of a second drop transmission path. The optical fibers 12a and 11b are examples of a first main optical transmission path and the optical fibers 11a and 12b are examples of a second main optical transmission path The optical loopback circuits 5a, 5b, 5c1 and 5c2 are inserted between the A station 1, the B station 2, the C1 station 3a and the C2 station 3B and the optical separating/combining section 4, respectively. For simplification of description, the number of the optical loopback circuits in each position is only one as shown as the optical loopback circuits 5a, 5b, 5c1 or 5c2 in FIG. 2. However, the number of the optical loopback circuits in each position may be two or more. Further, when multi-stage optical repeaters are inserted in the transmission path because the submarine cable is long, the optical loopback circuits 5a, 5b, 5c1 and 5c2 are preferably inserted between the optical repeaters. Further, to monitor a state of the transmission path up to a connection point from each station to the optical separating/combining section 4, an optical loopback circuit may be provided in each of the A station 1, the B station 2, the C1 station 3a and the C2 station 3b.

The A station 1 transmits a main signal λwdm1 serving as traffic and a monitor signal λa1 for monitoring the transmission path onto the optical fiber 11a. The A station 1 receives a main signal λwdm2 and the monitor signal λa1 transmitted through the optical fiber 11b. The B station 2 transmits the main signal λwdm2 serving as traffic and a monitor signal λb1 for monitoring the transmission path onto the optical fiber 12a. The B station 2 receives the main signal λwdm1 and the monitor signal λb1 transmitted in the optical fiber 11b.

The main signals λwdm1 and λwdm2 are WDM signals. Further, the main signal λwdm1 is an example of a second wavelength division multiplexing signal and the main signal λwdm2 is an example of a first wavelength division multiplexing signal. The A station 1 and the B station 2 may transmit the monitor signals λa1 and λb1 only during monitoring the transmission paths. Moreover, during transmission of the monitor signal λa1, the A station 1 may transmit a combined signal of the monitor signal λa1 and the main signal λwdm1. In addition, during transmission of the monitor signal λb1, the B station 2 may transmit a combined signal of the monitor signal λb1 and the main signal λwdm2.

The C station 3 is an add/drop station transmitting or receiving an optical signal to be added to or dropped from each of the main signals λwdm1 and λwdm2 transmitted on the optical fibers between the A station 1 and the B station 2. The C1 station 3a transmits an optical signal λca for communication with the A station 1 and a monitor signal for monitoring the transmission path to the optical fiber 13a1. In this case, the C1 station 3a transmits a monitor signal λc1 for monitoring the optical fibers 13a1 and 13b2. The C1 station 3a also receives the optical signal λac for communication with the A station 1 and the monitor signal λc1 from the optical fiber 13a2. The C2 station 3b transmits an optical signal λcb for communication with the B station 2 and a monitor signal for monitoring the transmission path to the optical fiber 13b1. In this case, the C2 station 3b transmits as the monitor signal, a monitor signal λc2 for monitoring the optical fibers 13b1 and 13a2. The C2 station 3b also receives an optical signal λbc for communication with the B station 2 and the monitor signal λc2 from the optical fiber 13b2.

Each of the optical signals λca, λac, λcb and λbc may be a WDM signal or a single wavelength signal. It is assumed herein that the optical signals λca and λac are identical in wavelength and that the optical signals λcb and λbc are identical in wavelength. Furthermore, the optical signals λca and λcb (or λac and λbc) may be identical in wavelength to effectively use wavelength bands for the main signals λwdm1 and λwdm2 transmitted between the A station 1 and the B station 2.

The optical signal λca is an example of a first add signal and the optical signal λbc is an example of a first drop signal. The optical signal λcb is an example of a second add signal and the optical signal λac is an example of a second drop signal. In this case, the C1 station 3a and the C2 station 3b can transmit the monitor signals λc1 and λc2 only during monitoring of the transmission paths. The C1 station 3a and C2 station 3b can transmit combined signals of the monitor signal λc1 and λc2 and the optical signal λca and λcb when transmitting the monitor signals λc1 and λc2, respectively.

Moreover, in the present exemplary embodiment, the monitor signals λa1, λb1, λc1 and λc2 differ in wavelength. Alternatively, when the A station 1, the B station 2 and the C1 and C2 stations 3a and 3b do not transmit the monitor signals simultaneously, that is, the transmission paths are not simultaneously monitored, the monitor signals λa1, λb1, λc1 and λc2 may be made identical in wavelength.

It is to be noted that the C1 station 3a is an example of first communication means and that the C2 station is an example of second communication means.

The optical separating/combining section 4 includes optical separating/combining units 41 to 44. The optical separating/combining units 41 and 44 are connected with an optical fiber 45 for transmitting the main signal λwdm2 and an optical fiber 46 for transmitting the monitor signal λc2. The optical separating/combining unit 42 and 43 are connected with an optical fiber 47 for transmitting the main signal λwdm1 and an optical fiber 48 for transmitting the monitor signal λc2. The optical separating/combining unit 41 passes the main signal λwdm1 and the monitor signal λa1 and λb1 through the optical fiber 45 to the optical fiber 11a. However, the optical separating/combining unit 41 does not pass the optical signal λca contained in the main signal λwdm1. Furthermore, the optical separating/combining unit 41 drops the optical signal λac from the main signal λwdm1 transmitted on the optical fiber 11a into the optical fiber 13a2. The optical separating/combining unit 41 passes the monitor signals λc1 and λc2 passed through the optical separating/combining unit 44 onto the optical fiber 13a1.

The optical separating/combining unit 42 passes the main signal λwdm2 and the monitor signals λa1 and λb1 on the optical fiber 12a to the optical fiber 11b. Further, the optical separating/combining unit 42 adds the optical signal λca on the optical fiber 13a1 to the main signal λwdm2 on the optical fiber 12a. Moreover, the optical separating/combining unit 42 passes the monitor signals λc1 and λc2 on the optical fiber 13a1 to the optical fiber 48.

The optical separating/combining unit 43 passes the main signal λwdm2 and the monitor signals λa1 and λb1 on the optical fiber 12a through the optical fiber 47 to the optical fiber 11b. However, the optical separating/combining unit 43 does not pass the optical signal λbc contained in the main signal λwdm2 to the optical fiber 11b. Furthermore, the optical separating/combining unit 43 drops the optical signal λbc from the main signal λwdm2 on the optical fiber 12a onto the optical fiber 13b2. The optical separating/combining unit 43 passes the monitor signals λc1 and λc2 through the optical separating/combining unit 42 to the optical fiber 13b2.

The optical separating/combining unit 44 passes the main signal λwdm1 and the monitor signals λa1 and λb1 on the optical fiber 11a to the optical fiber 12b. Further, the optical separating/combining unit 44 adds the optical signal λcb on the optical fiber 13b1 to the main signal λwdm on the optical fiber 12b. Moreover, the optical separating/combining unit 42 passes the monitor signals λc1 and λc2 on the optical fiber 13b1 to the optical fiber 46.

The optical separating/combining unit 42 is an example of first add section and the optical separating/combining unit 43 is an example of first drop section. The optical separating/combining unit 44 is an example of second add section and the optical separating/combining unit 41 is an example of second drop section.

Figure 3:
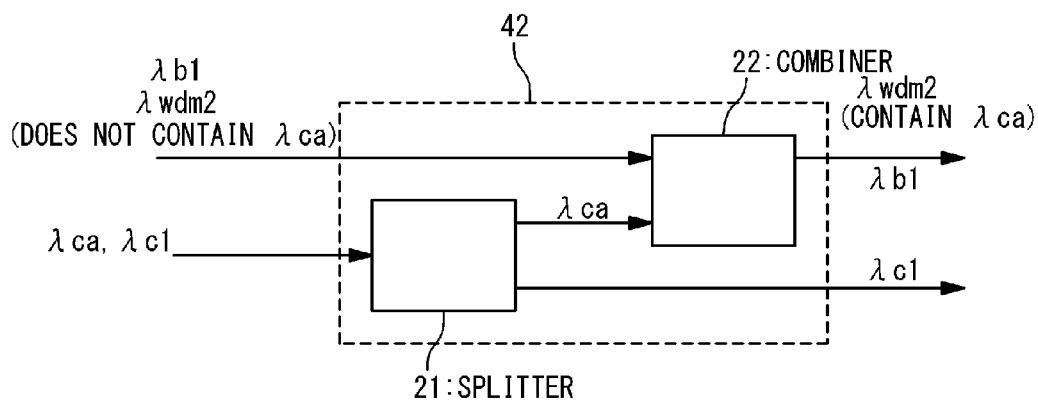
FIG. 3 is a block diagram showing an example of a configuration of an optical separating/combining unit 42 of FIG. 2.
Figure 4:
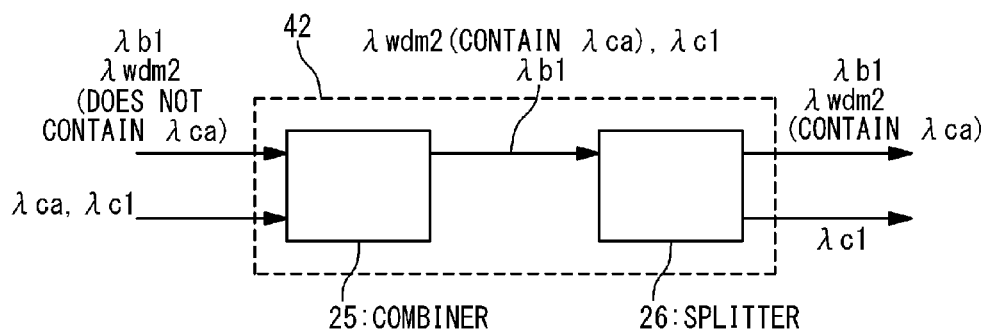
FIG. 4 is a block diagram showing another example of a configuration of the optical separating/combining unit 42 of FIG. 2.
Figure 5:
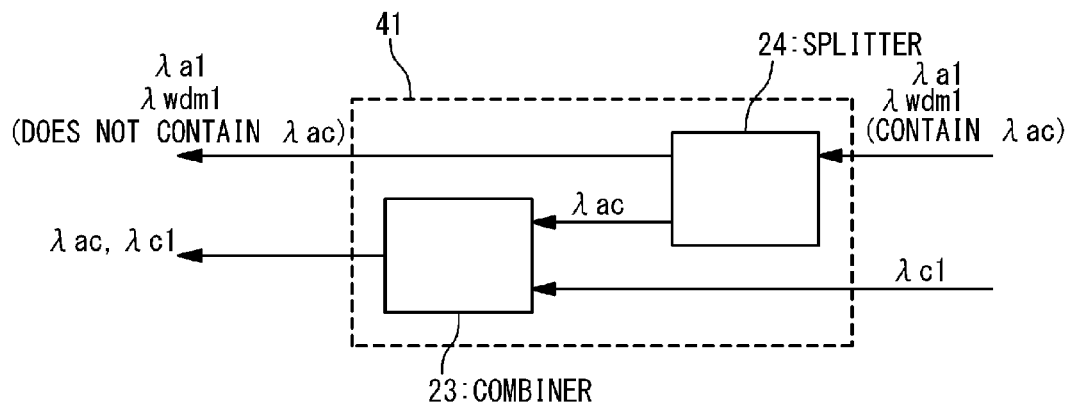
FIG. 5 is a block diagram showing an example of a configuration of the optical separating/combining unit 41 of FIG. 2.
Figure 6:
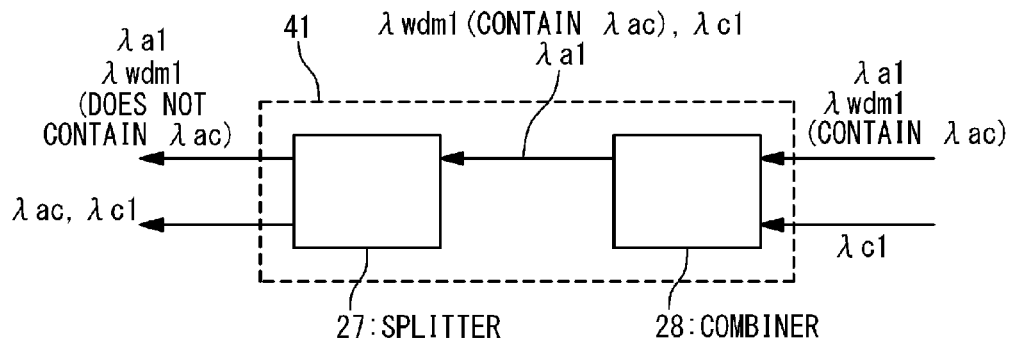
FIG. 6 is a block diagram showing another example of a configuration of the optical separating/combining unit 41 of FIG. 2.
Figure 11:
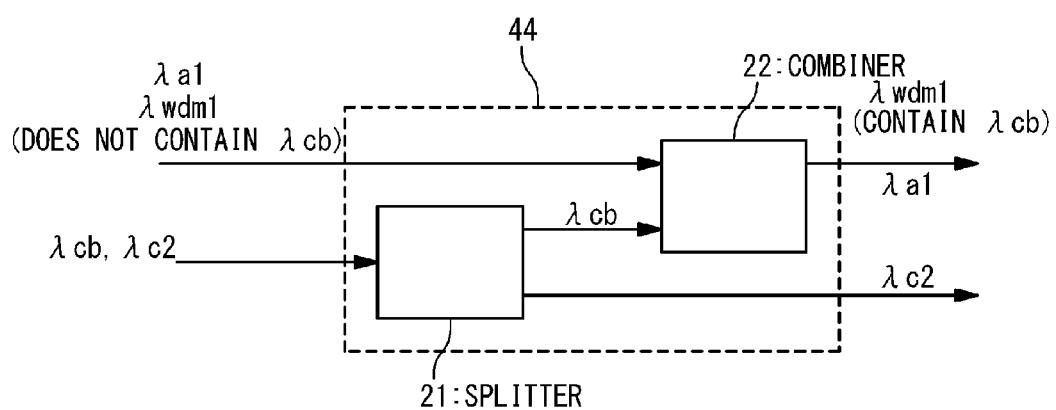
FIG. 11 is a block diagram showing an example of a configuration of the optical separating/combining unit 44 of FIG. 2.
Figure 12:
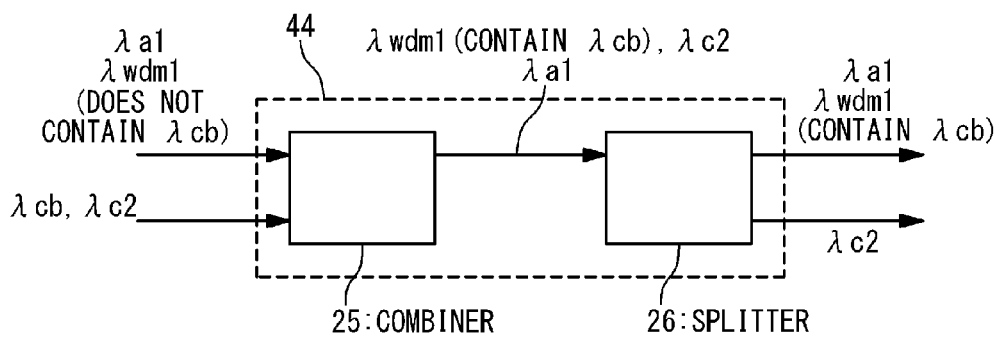
FIG. 12 is a block diagram showing another example of a configuration of the optical separating/combining unit 44 of FIG. 2.
Figure 13:
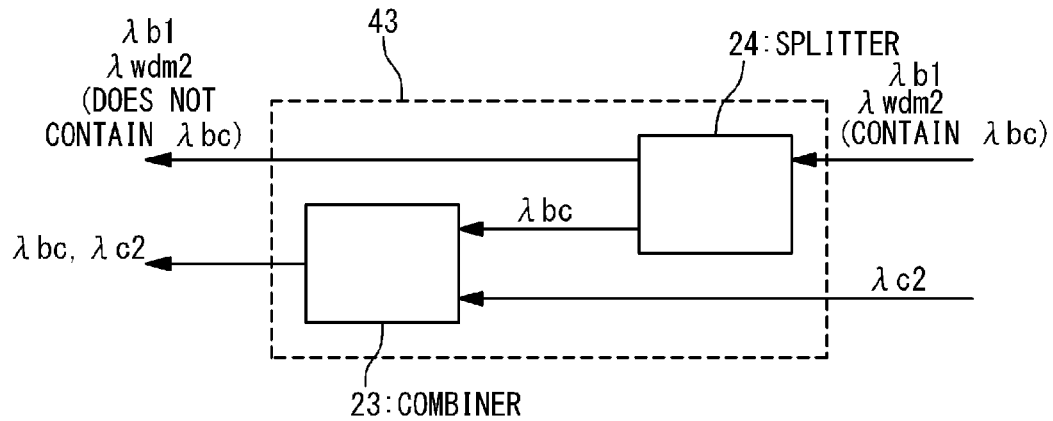
FIG. 13 is a block diagram showing an example of a configuration of the optical separating/combining unit 43 of FIG. 2.
Figure 14:
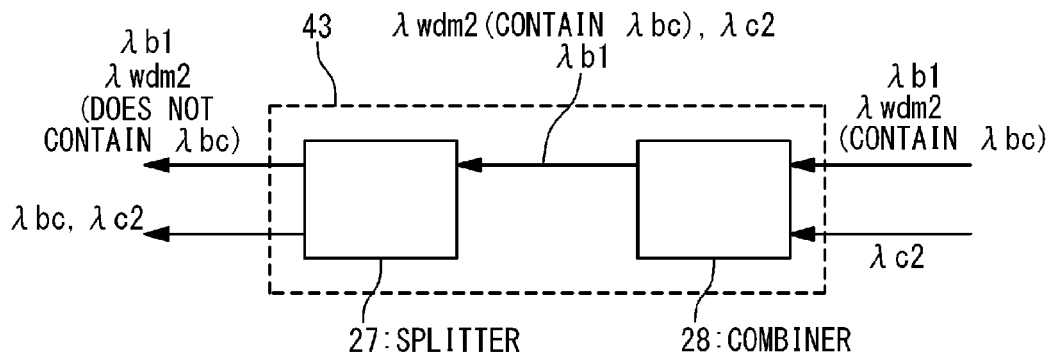
FIG. 14 is a block diagram showing another example of a configuration of the optical separating/combining unit 43 of FIG. 2.

FIGS. 3 and 4 are block diagrams showing examples of configurations of the optical separating/combining unit 42. FIGS. 5 and 6 are block diagrams showing examples of configurations of the optical separating/combining unit 41. FIGS. 11 and 12 are block diagrams showing examples of configurations of the optical separating/combining unit 44. FIGS. 13 and 14 are block diagrams showing examples of configurations of the optical separating/combining unit 43.

In FIG. 3, the optical separating/combining unit 42 includes a splitting unit 21 and a combining unit 22. The splitting unit 21 separates a combined signal of an optical signal λca and a monitor signal λc1 into the optical signal λca and the monitor signal λc1 and passes the monitor signal λc1 obtained by separating. The combining unit 22 adds the optical signal λca obtained from the splitting unit 21 to a combined signal of the main signal λwdm2 that does not include the optical signal λca and a monitor signal λb1, and passes the resultant signal by adding.

In FIG. 4, the optical separating/combining units 42 includes a combining unit 25 and a splitting unit 26. The combining unit 25 adds a combined signal of the optical signal λca and the monitor signal λc1 to a combined signal of the main signal λwdm2 that does not include the optical signal λca and the monitor signal λb1. The splitting unit 26 separates the signal obtained from the combining unit 25 into the combined signal of the main signal λwdm2, that includes the optical signal λca and the monitor signal λb1, and the monitor signal λc1, and passes the combined signal and the monitor signal λc1.

In FIG. 5, the optical separating/combining unit 41 includes a combining unit 23 and a splitting unit 24. The splitting unit 24 separates a combined signal of the main signal λwdm1 that includes an optical signal λac and the monitor signal λa1 into a combined signal of the main signal λwdm1 that does not include the optical signal λac and the monitor signal λa1, and the optical signal λac, and passes the combined signal. The combining unit 23 adds the monitor signal λc1 to the optical signal λac obtained from the splitting unit 24 and passes the signal obtained by adding.

In FIG. 6, the optical separating/combining unit 42 and 44 includes a splitting unit 27 and a combining unit 28. The combining unit 28 adds the monitor signal λc1 to the combined signal of the main signal λwdm1 that includes the optical signal λac and the monitor signal λa1. The splitting unit 27 separates the signal obtained from the combining unit 28 into the combined signal of the main signal λwdm1 that does not include the optical signal λac and the monitor signal λa1, and the combined signal of the optical signal λac and the monitor signal λc1, and passes the combined signals obtained by combining.

In FIG. 11, the optical separating/combining unit 44 includes a splitting unit 21 and a combining unit 22. The splitting unit 21 separates a combined signal of an optical signal λcb and a monitor signal λc2 into the optical signal λcb and the monitor signal λc2 and passes the monitor signal λc2 obtained by separating. The combining unit 22 adds the optical signal λcb obtained from the splitting unit 21 to a combined signal of the main signal λwdm1 that does not include the optical signal λcb and a monitor signal λa1, and passes the resultant signal by adding.

In FIG. 12, the optical separating/combining unit 44 includes a combining unit 25 and a splitting unit 26. The combining unit 25 adds a combined signal of the optical signal λcb and the monitor signal λc2 to a combined signal of the main signal λwdm1 that does not include the optical signal λcb and the monitor signal λa1. The splitting unit 26 separates the signal obtained from the combining unit 25 into the combined signal of the main signal λwdm1, that includes the optical signal λcb and the monitor signal λa1, and the monitor signal λc2, and passes the combined signal and the monitor signal λc2.

In FIG. 13, the optical separating/combining unit 43 includes a combining unit 23 and a splitting unit 24. The splitting unit 24 separates a combined signal of the main signal λwdm2 that includes an optical signal λbc and the monitor signal λb1 into a combined signal of the main signal λwdm2 that does not include the optical signal λbc and the monitor signal λb1, and the optical signal λbc, and passes the combined signal. The combining unit 23 adds the monitor signal λc2 to the optical signal λbc obtained from the splitting unit 24 and passes the signal obtained by adding.

In FIG. 14, the optical separating/combining unit 43 includes a splitting unit 27 and a combining unit 28. The combining unit 28 adds the monitor signal λc2 to the combined signal of the main signal λwdm2 that includes the optical signal λbc and the monitor signal λb1. The splitting unit 27 separates the signal obtained from the combining unit 28 into the combined signal of the main signal λwdm2 that does not include the optical signal λbc and the monitor signal λb1, and the combined signal of the optical signal λbc and the monitor signal λc2, and passes the combined signals obtained by combining.

In the configurations shown in FIGS. 3, 5, 11 and 13, the optical signal λca, λcb, λac, or λbc, is transmitted but the monitor signal λa1, λb1, λc1, or λc1 are not transmitted on a transmission path between the splitting unit 21 and the combining unit 22 and between the splitting unit 24 and the combining unit 23. Thus, these transmission paths cannot be monitored. However, since the transmission paths are quite short, the necessity to monitor the transmission paths is low. Moreover, the main signal λwdm1 and λwdm2 stays away from the monitor signals λc1 and λc2 at all locations on the transmission path from the A station 1 to the B station 2 on which the main signals λwdm1 and λwdm2 are transmitted. Thus, signals identical in wavelength to the monitor signals λc1 and λc2 can be used on the transmission path from the A station 1 to the B station 2 for purposes different from monitor of the transmission path.

In the configurations shown in FIGS. 4, 6, 12 and 14, it is possible to monitor all the transmission paths on which the optical signals λca, λac, λcb and λbc are transmitted and which include the transmission paths between the splitting unit 21 and the combining unit 22 or between the splitting unit 24 and the combining unit 23. A combining method used by each of the optical combining units 22, 23, 26 and 28 is a wavelength combining method or an intensity combining method. However, the combining method used by each of the optical combining units 22, 23, 26 and 28 is not limited to the combining method such as the wavelength combining method or the intensity combining method but can be appropriately changed.

Referring back to FIG. 2, the optical loopback circuit 5a transmits the monitor signal λa1 on the optical fiber 11a to the optical fiber 11b, thereby looping back the monitor signal λa1 to the A station 1. Further, the optical loopback circuit 5a transmits the monitor signal λb1 on the optical fiber 11b to the optical fiber 11a, thereby looping back the monitor signal λb1 to the B station 2. The optical loopback circuit 5b transmits the monitor signal λb1 on the optical fiber 12a to the optical fiber 12b, thereby looping back the monitor signal λb1 to the B station 2. Further, the optical loopback circuit 5b transmits the monitor signal λa1 on the optical fiber 12b to the optical fiber 12a, thereby looping back the monitor signal λa1 to the A station 1.

The optical loopback circuit 5c1 transmits the monitor signal λc1 on the optical fiber 13a1 to the optical fiber 13a2, thereby looping back the monitor signal λc1 to the C1 station 3a. Further, the optical loopback circuit 5c1 transmits the monitor signal λc2 on the optical fiber 13a2 to the optical fiber 13a1, thereby looping back the monitor signal λc2 to the C2 station 3b. The optical loopback circuit 5c2 transmits the monitor signal λc2 on the optical fiber 13b1 to the optical fiber 13b2, thereby looping back the monitor signal λc2 to the C2 station 3b. Further, the optical loopback circuit 5c2 transmits the monitor signal λc1 on the optical fiber 13b2 to the optical fiber 13b1, thereby looping back the monitor signal λc1 to the C1 station 3a.

It should be noted that the optical loopback circuit 5c1 is an example of second loopback section and that the optical loopback circuit 5c2 is an example of first loopback section.

A light intensity ratio of the signal looped back by each of the optical loopback circuits 5a, 5b, 5c1 and 5c2 to an original signal may be in a range greater than 0% and smaller than 100%. That is, each of the optical loopback circuits 5a, 5b, 5c1 and 5c2 needs to pass the original signal to a rear stage at least.

Each of the optical loopback circuits 5a, 5b, 5c1 and 5c2 may loop back reflected light and scattered light of the monitor signal to monitor the transmission paths using the OTDR.

An operation of the communication system will next be described.

At first, an operation of the communication system using the submarine cable for monitoring of the transmission paths from the A station 1 to the B station 2 will be described.

The A station 1 transmits the monitor signal λa1 to the optical fiber 11a. After being transmitted from the A station 1 to the optical fiber 11a, the monitor signal λa1 arrives at the optical separating/combining section 4. The monitor signal λa1 passes through the optical separating/combining section 4 and arrives at the B station 2 via the optical fiber 12b. Each time arriving at the optical loopback circuit 5a or 5b provided on the transmission paths from the A station 1 to the B station 2, the monitor signal λa1 arrives at the A station 1 via the transmission paths from the B station 2 to the A station 1 (optical fiber 11b or the optical fibers 12a and 11b).

When receiving the monitor signal λa1, the A station 1 analyzes an optical level of the received monitor signal λa1, time from transmission to reception of the monitor signal λa1, signals superimposed on the received monitor signal λa1 or the like, and analyzes a failure of the transmission paths from the A station 1 to the B station 2 or of the transmission paths from the B station 2 to the A station 1.

An operation of the communication system for monitoring the transmission paths from the B station 2 to the A station 1 is similar to that for monitoring of the transmission paths from the A station 1 to the B station 2 except for replacing the A station 1 with the B station 2, the optical fibers 11a and 11b with the optical fibers 12a and 12b.

An operation of the communication system for monitoring of the transmission paths from the C1 station 3a to the optical separating/combining section 4 will next be described.

The C1 station 3a transmits the monitor signal λc1 to the optical fiber 13a1. After being transmitted from the C1 station 3a, the monitor signal λc1 arrives at the optical separating/combining section 4. The optical separating/combining unit 42 included in the optical separating/combining section 4 passes the monitor signal λc1 to the optical fiber 48. The optical separating/combining unit 43 passes the monitor signal λc1 on the optical fiber 48 to the optical fiber 13b2. The monitor signal λc1 is on the optical fiber 13b2 and arrives at the C2 station 3b. Furthermore, each time arriving at the optical loopback circuits 5c1 or 5c2 provided on the transmission paths from the C1 station 3a to the C2 station 3b, the monitor signal λc1 is transmitted to the transmission paths from the C2 station 3b to the C1 station 3a. Thus, the monitor signal λc1 is looped back to the C1 station 3a.

Specifically, when the monitor signal λc1 on the optical fiber 13a1 arrives at the optical loopback circuit 5c1, the optical loopback circuit 5c1 transmits the monitor signal λc1 to the optical fiber 13a2. Moreover, when the monitor signal λc1 on the optical fiber 13b2 arrives at the optical loopback circuit 5c2, the optical loopback circuit 5c2 transmits the monitor signal λc1 to the optical fiber 13b1. The monitor signal λc1 arrives at the optical separating/combining section 4 after being transmitted from the optical loopback circuit 5c2.

The optical separating/combining unit 44 included in the optical separating/combining section 4 passes the monitor signal λc1 to the optical fiber 46. The optical separating/combining unit 41 passes the monitor signal λc1 on the optical fiber 46 to the optical fiber 13a2. The monitor signal λc1 is on the optical fiber 13a2 and arrives at the C1 station 3a. When receiving the monitor signal λc1, the C1 station 3a analyzes an optical level of the received monitor signal λc1, time from transmission to reception of the monitor signal λc1, signals imposed on the received monitor signal λc1 or the like, and can monitor the transmission paths from the C1 station 3a to the optical separating/combining section 4.

An operation the communication system for monitoring of the transmission paths from the C2 station 3*b* to the optical separating/combining section 4 will next be described.

The C2 station 3*b* transmits the monitor signal λc2 to the optical fiber 13*b*1. After being transmitted from the C2 station 3*b*, the monitor signal λc2 arrives at the optical separating/combining section 4. The optical separating/combining unit 44 included in the optical separating/combining section 4 passes the monitor signal λc2 to the optical fiber 46. The optical separating/combining unit 41 passes the monitor signal λc2 on the optical fiber 46 to the optical fiber 13*a*2. The monitor signal λc2 is on the optical fiber 13*a*2 and arrives at the C1 station 3*a*. Furthermore, each time arriving at the optical loopback circuit 5*c*1 or 5*c*2 provided on the transmission paths from the C2 station 3*b* to the C1 station 3*a*, the monitor signal λc2 is transmitted to the transmission paths from the C1 station 3*a* to the C2 station 3*b*. The monitor signal λc2 is looped back to the C2 station 3*b*.

Specifically, when the monitor signal λc2 on the optical fiber 13*b*1 arrives at the optical loopback circuit 5*c*2, the optical loopback circuit 5*c*2 transmits the monitor signal λc2 to the optical fiber 13*b*2. Moreover, when the monitor signal λc2 on the optical fiber 13*a*2 arrives at the optical loopback circuit 5*c*1, the optical loopback circuit 5*c*1 transmits the monitor signal λc2 to the optical fiber 13*a*1. The monitor signal λc2 arrives at the optical separating/combining section 4 after being transmitted from the optical loopback circuit 5*c*1.

The optical separating/combining unit 42 included in the optical separating/combining section 4 passes the monitor signal λc2 to the optical fiber 48. The optical separating/combining unit 42 passes the monitor signal λc2 on the optical fiber 48 to the optical fiber 13*b*2. The monitor signal λc2 is on the optical fiber 13*b*2 and arrives at the C2 station 3*b*. When receiving the monitor signal λc2, the C2 station 3*b* analyzes an optical level of the received monitor signal λc2, time from transmission to reception of the monitor signal λc2, signals imposed on the received monitor signal λc2 or the like, and can monitor the transmission paths from the C2 station 3*b* to the optical separating/combining section 4.

Further, when there is no need to measure a detailed relation between a reduction amount of the optical level and a distance by the OTDR, the transmission paths from the B station 2 to the A station 1 as a route in an opposite direction can be also monitored using the monitor signal λa1 transmitted from the A station 1. However, this method possibly deteriorates monitoring accuracy. Moreover, if a component that blocks off the reflected light such as an optical isolator included in a repeater of the submarine cable is not present in the transmission paths, it is possible to measure the detailed relation between the reduction amount of the optical level and the distance in the transmission paths from the B station 2 to the A station 1 as a route in the opposite direction using the monitor signal λa1 transmitted from the A station 1.

Likewise, when there is no need to measure the detailed relation between the reduction amount of the optical level and the distance by the OTDR, the transmission paths (optical fibers 13*b*1, 46 and 13*a*2) from the C2 station 3*b* to the C1 station 3*a* in an opposite direction can also be monitored using the monitor signal λc1 transmitted from the C1 station 3*a*. However, this method possibly deteriorates monitoring accuracy. Moreover, if a component that prevents the reflected light such as the optical isolator included in the repeater of the submarine cable is not present in the transmission paths, it is possible to measure the detailed relation between the reduction amount of the optical level and the distance in the transmission paths from the C2 station 3*b* to the C1 station 3*a* in the opposite direction using the monitor signal λc1 transmitted from the C1 station 3*a*.

Next, the advantages will be described.

In the present exemplary embodiment, the C1 station 3*a* transmits the monitor signal to the optical fiber 13*a*1. The optical separating/combining unit 42 passes the monitor signal on the optical fiber 13*a*1. The optical separating/combining unit 43 passes the monitor signal passed by the optical separating/combining unit 42 to the optical fiber 13*b*2. The optical loopback circuit 5*c*2 transmits the monitor signal on the optical fiber 13*b*2 to the optical fiber 13*b*. The optical separating/combining unit 44 passes the monitor signal on the optical fiber 13*b*1. The optical separating/combining unit 41 passes the monitor signal passed by the optical separating/combining unit 44 to the optical fiber 13*a*2. The C1 station receives the monitor signal on the optical fiber 13*a*2. The optical separating/combining units 41 to 44 constitute the optical separating/combining section 4.

In this case, the monitor signal transmitted from the C1 station 3*a* is not transmitted to the transmission paths other than the add/drop transmission paths to perform add/drop in the optical separating/combining section 4. Therefore, even if a plurality of optical separating/combining units 4 are present, all the optical separating/combining units 4 can use signals identical in wavelength as monitor signals. Accordingly, even if the number of optical separating/combining units 4 increases, there is no need to increase the number of wavelengths used as monitor signals. Therefore, it is possible to suppress a decrease in a wavelength band available for the main signal.

Moreover, in the present exemplary embodiment, each of the optical separating/combining unit 41 and 43 includes the splitting unit 21 and the combining unit 22. Each of the optical separating/combining unit 42 and 44 includes the combining unit 23 and the splitting unit 24. The splitting unit 21 separates the combined signal of the optical signal λca or λcb and the monitor signal λc1 or λc2 into the optical signal λca or λcb and the monitor signal λc1 or λc2, and passes the monitor signal λc1 or λc2 obtained by demultiplexing. The combining unit 22 adds the optical signal λca or λcb obtained by the splitting unit 21 to the combined signal of the main signal λwdm1 or λwdm2 that does not include the optical signal λca or λcb and the monitor signal λa1 or λb1, and passes the signal obtained by adding. The splitting unit 24 separates the combined signal of the main signal λwdm1 or λwdm2 that includes the optical signal λac or λbc and the monitor signal λa1 or λb1 into the combined signal of the main signal λwdm1 or λwdm2 that does not include the optical signal λac or λbc and the monitor signal λa1 or λb1 and the optical signal λac or λbc, and passes the combined signal of the main signal λwdm1 or wdm2 that does not include the optical signal λac or λbc and the monitor signal λa1 or λb1. The combining unit 23 adds the monitor signal λc1 or λc2 to the optical signal λac or λbc obtained by the splitting unit 24 and passes the signal obtained by adding.

In this case, the main signal λwdm1 or λwdm2 stays away from the monitor signals λc1 and λc2 at all locations on the transmission paths, on which the main signal λwdm1 or λwdm2 is transmitted, from the A station 1 to the B station 2. Thus, signals identical in wavelength to the monitor signals λc1 and λc2 can be used on the transmission paths from the A station 1 to the B station 2 for purposes different from monitoring of the transmission paths.

Moreover, in the present exemplary embodiment, each of the optical separating/combining units 41 and 43 includes the combining unit 25 and the splitting unit 26. Further, each of the optical separating/combining units 42 and 44 includes the splitting unit 27 and the combining unit 28. The combining unit 25 adds the combined signal of the optical signal λca or λcb and the monitor signal λc1 or λc2 to the combined signal of the main signal λwdm1 or λwcm2 that does not include the optical signal λca or λcb and the monitor signal λa1 or ~b1.

The splitting unit 26 separates the signal obtained by the combining unit 25 into the combined signal of the main signal λwdm1 or λwdm2 that includes the optical signal λca or λcb and the monitor signal λa1 or λb1, and the monitor signal λc1 or λc2, and passes each of the combined signal and the monitor signal λc1 or λc2 obtained by separating. The combining unit 28 adds the monitor signal λc1 or λc2 to the combined signal of the main signal λwdm1 or λwdm2 that includes the optical signal λac or λbc and the monitor signal λa1 or λb1. The splitting unit 27 separates the signal obtained by the combining unit 28 into the combined signal of the main signal λwdm1 or λwdm2 that does not includes the optical signal λac or λbc and the monitor signal λa1 or λb1, and the combined signal of the optical signal λac or λbc and the monitor signal λc1 or λc2, and passes each of the combined signals obtained by separating.

In this case, it is possible to monitor all the transmission paths on which the optical signals λca, λac, λcb and λbc are transmitted. Moreover, in the present exemplary embodiment, the C1 station 3a transmits the monitor signal λc1 for monitoring the optical fibers 13a1 and 13b2, and the C2 station 3b transmits the monitor signal λc2 for monitoring the optical fibers 13b1 and 13a2. In this case, it is possible to measure the detailed relation between a reduction amount of the optical level and a distance.

[Second Exemplary Embodiment]

Figure 7:
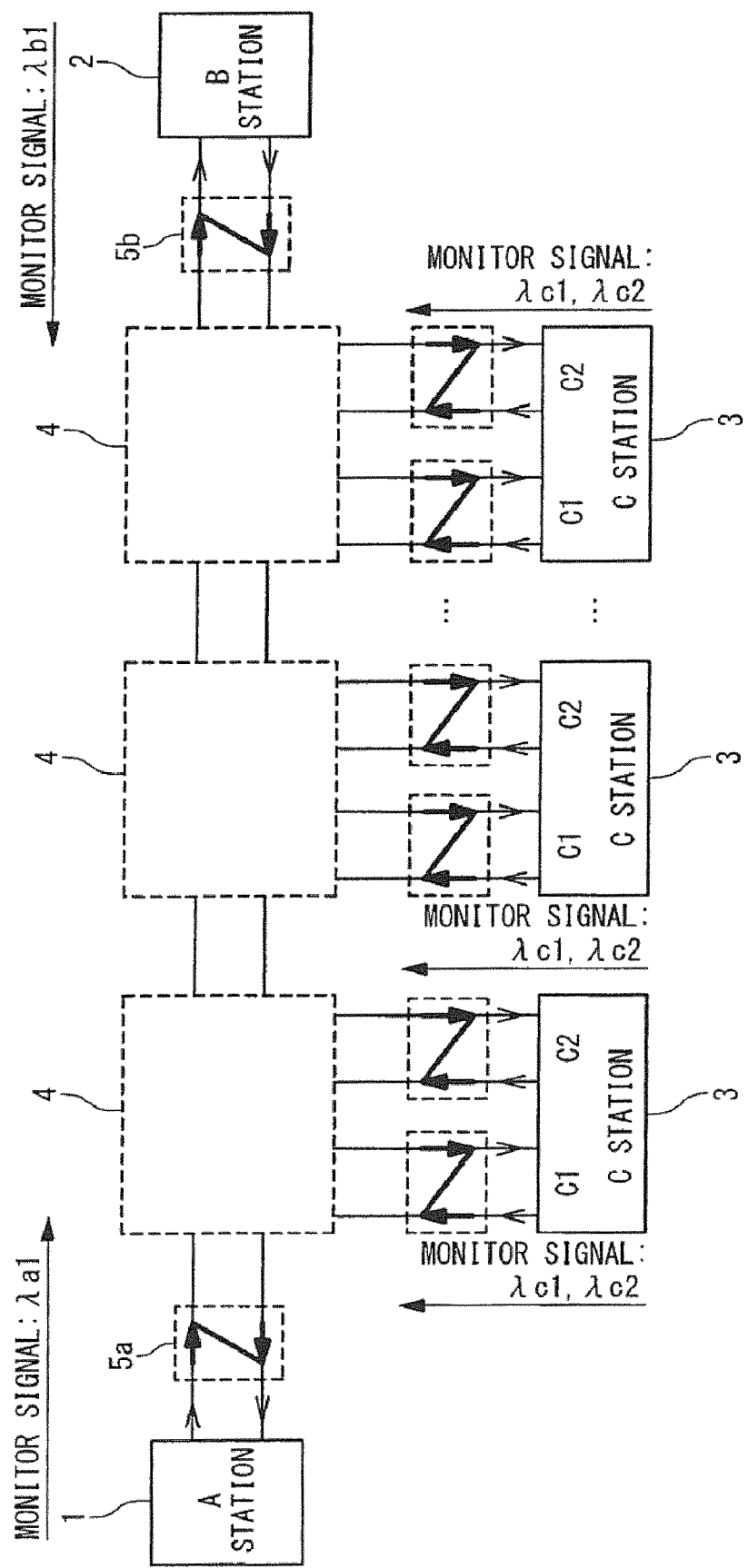
FIG. 7 is a block diagram showing a submarine cable using communication system according to a second exemplary embodiment of the present invention.

The communication system using a submarine cable according to a second exemplary embodiment of the present invention will be described. FIG. 7 is a block diagram showing the communication system according to the second exemplary embodiment. Referring to FIG. 7, a plurality of C stations 3 serving as add/drop stations are provided while only one C station 3 is provided in FIG. 2.

Transmission paths on which monitor signals λc1 and λc2 are transmitted from each of the C stations 3 stay away from those on which the monitor signals λc1 and λc2 are transmitted from the other C stations 3. Accordingly, the wavelengths of the monitor signals λc1 and λc2 transmitted from the respective C stations 3 may be identical to each other. Therefore, even if the number of C stations 3 increases, the transmission paths can be monitored without increase the number of wavelengths used for monitor signals.

[Third Exemplary Embodiment]

Figure 8:
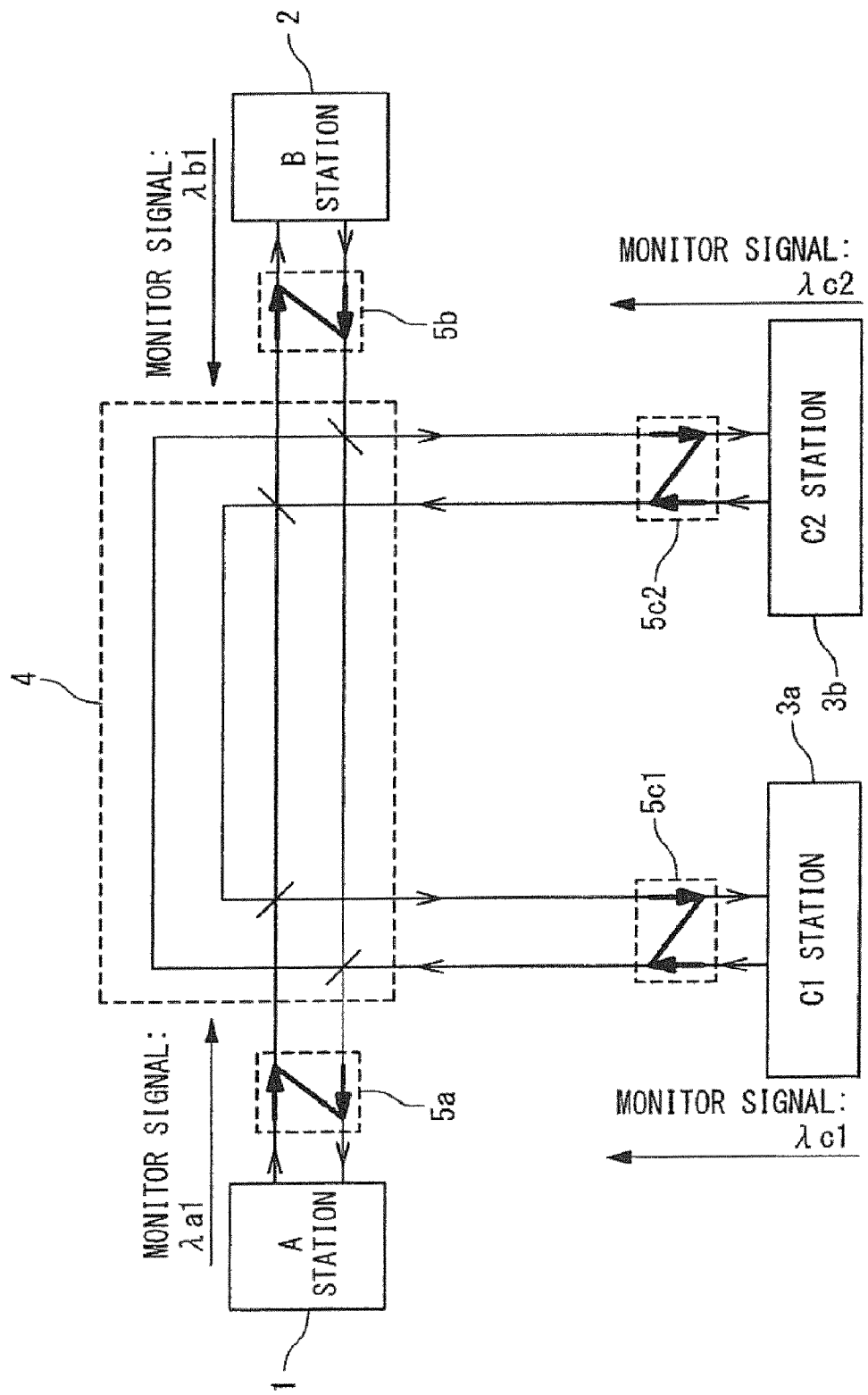
FIG. 8 is a block diagram showing a submarine cable using communication system according to a third exemplary embodiment of the present invention.

The communication system using a submarine cable according to a third exemplary embodiment of the present invention will be described. FIG. 8 is a block diagram showing the communication system according to the third exemplary embodiment. FIG. 8 shows that the C1 station 3a and the C2 station 3b are provided separately while FIG. 2 shows that the C1 station 3a and the C2 station 3b are included in the C station 3. In this case, similarly to the communication system shown in FIG. 2, transmission paths can be monitored.

[Fourth Exemplary Embodiment]

Figure 9:
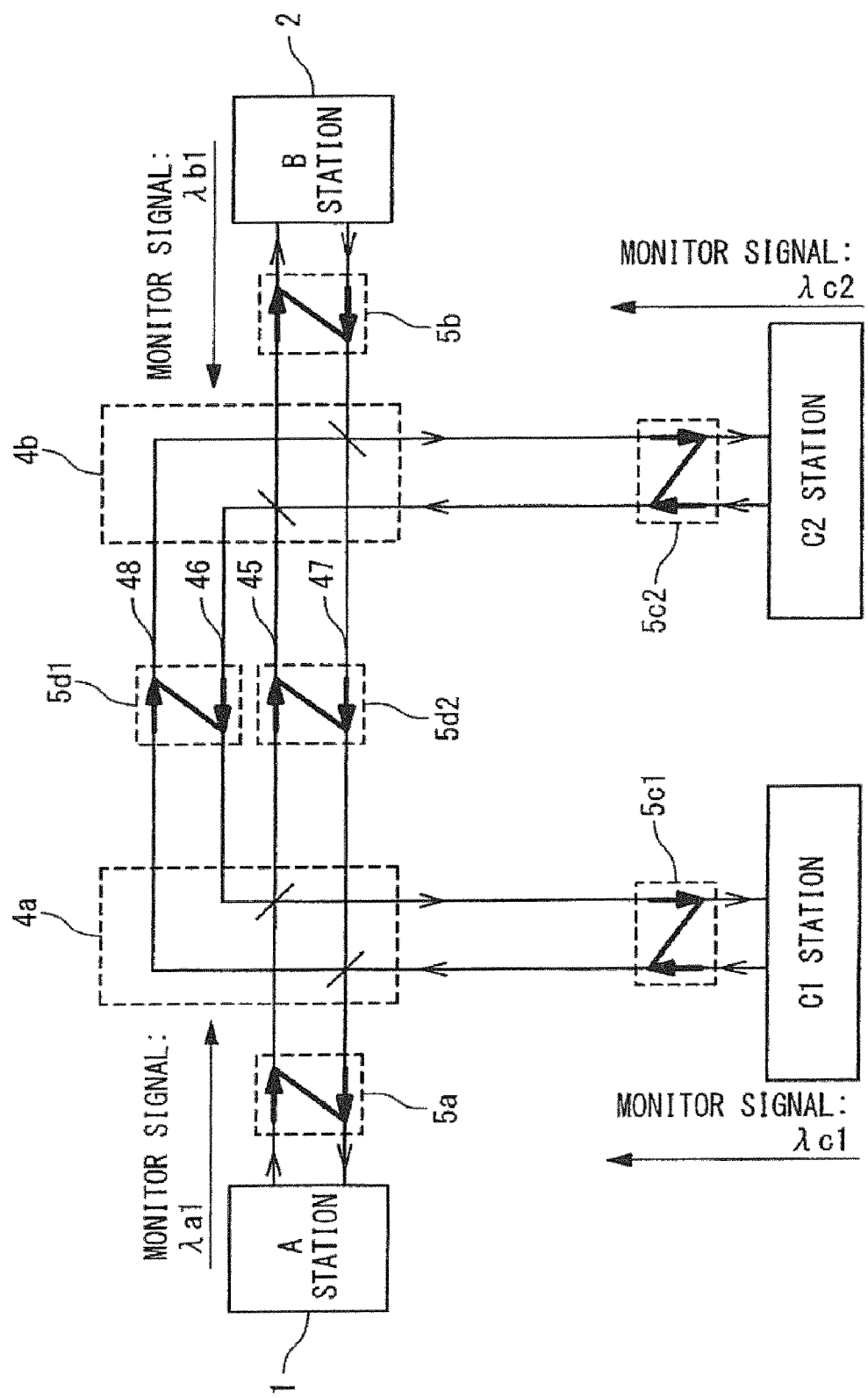
FIG. 9 is a block diagram showing a submarine cable using communication system according to a fourth exemplary embodiment of the present invention.

The communication system using a submarine cable according to a fourth exemplary embodiment of the present invention will be described. FIG. 9 is a block diagram showing the communication system according to the fourth exemplary embodiment. FIG. 9 shows that the C1 station 3a and the C2 station 3b are provided separately similarly to FIG. 8. Furthermore, FIG. 9 shows that the optical separating/combining section 4 shown in FIGS. 2 and 8 is divided into optical separating/combining units 4a and 4b.

The optical separating/combining section 4a includes optical separating/combining unit 41 and 42 and the optical separating/combining section 4b includes optical separating/combining unit 43 and 44. Optical fibers 45 and 46 connecting the optical separating/combining unit 41 and 44 to each other and optical fibers 47 and 48 connecting the optical separating/combining unit 42 and 43 to each other are provided in a submarine cable.

In the present exemplary embodiment, a repeater and an optical loopback circuit looping back a monitor signal to a sending side of the monitor signal may be inserted between a pair of the optical fibers 45 and 47 for transmitting main signals λwdm1 and λwdm2 and a pair of the optical fibers 46 and 48 for transmitting monitor signals λc1 and λc2.

[Fifth Exemplary Embodiment]

Figure 10:
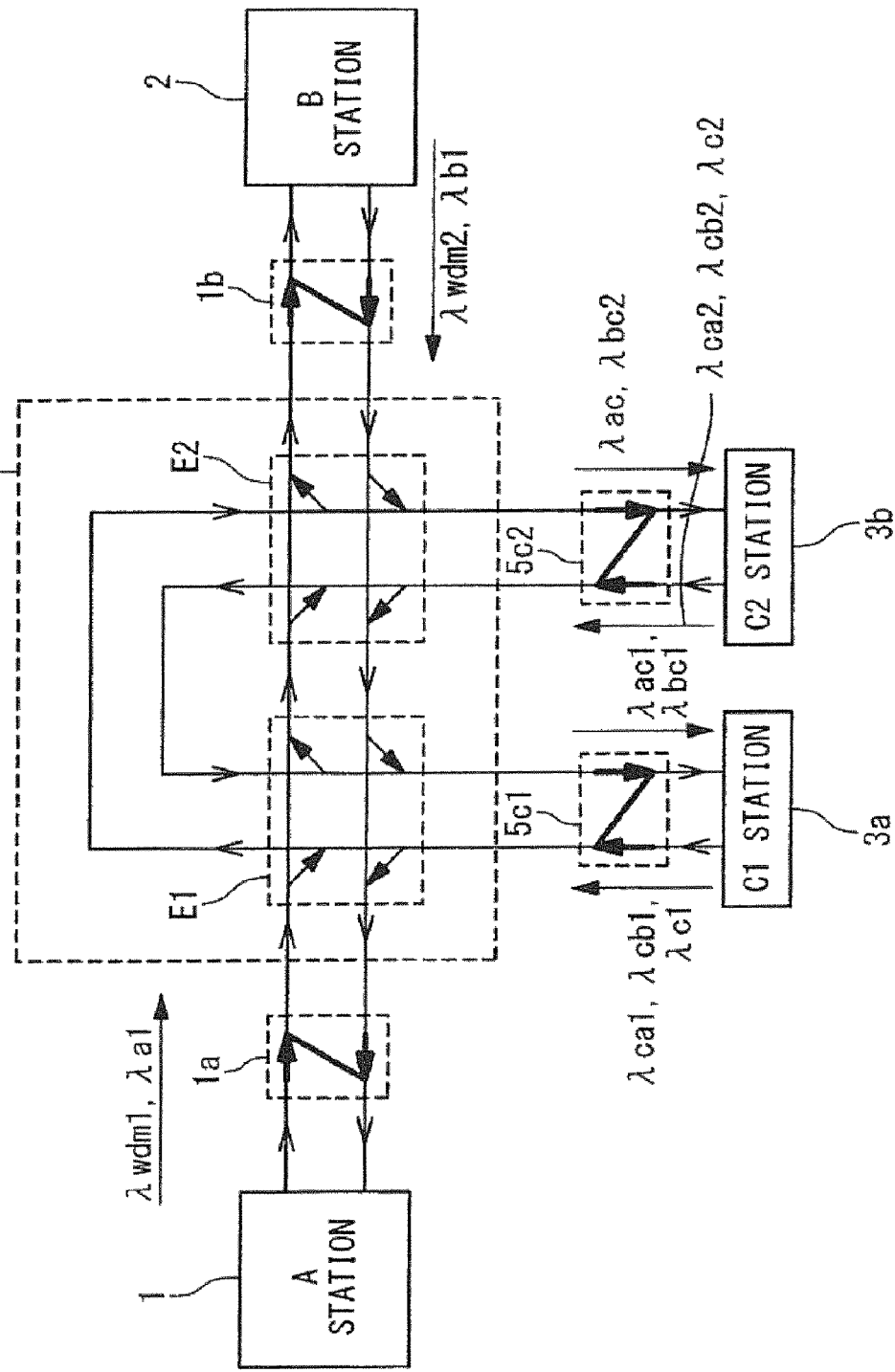
FIG. 10 is a block diagram showing a submarine cable using communication system according to a fifth exemplary embodiment of the present invention.

The communication system using a submarine cable according to a fifth exemplary embodiment of the present invention will be described. FIG. 10 is a block diagram showing the communication system according to the fifth exemplary embodiment.

In FIG. 10, similarly to FIG. 8, a C1 station 3a and a C2 station 3b are provided separately. Further, the communication system according to the present exemplary embodiment includes optical separating/combining unit E1 and E2 performing bidirectional add/drop in place of the optical separating/combining units 41 to 44 in the communication system shown in FIG. 2. An optical signal λca will be referred to as "optical signal λca1" and an optical signal λac will be referred to as "optical signal λac1". Furthermore, an optical signal λcb will be referred to as "optical signal λcb2" and an optical signal λbc will be referred to as "optical signal λbc2".

The C1 station 3a further transmits an optical signal λcb1 to an optical fiber 13a1 and further receives an optical signal λbc1. The C2 station further transmits an optical signal λca2 to an optical fiber 13b1 and further receives an optical signal λac2. The optical separating/combining unit E1 has functions of the optical separating/combining units 41 and 42. The optical separating/combining unit E1 also has a function of adding the optical signal λcb1 on the optical fiber 13a1 to a main signal λwdm1 on an optical fiber 11a, and a function of dropping the optical signal λbc1 from a main signal λwdm2 on an optical fiber 12a into an optical fiber 13a2.

The optical separating/combining unit E2 has functions of the optical separating/combining units 43 and 44. The optical separating/combining unit E2 also has a function of adding the optical signal λcb2 on the optical fiber 13b1 to the main signal λwdm2 on the optical fiber 12a, and a function of dropping the optical signal λac2 from the main signal λwdm1 on an optical fiber 11a into an optical fiber 13b2.

Even if an add/drop direction is bidirectional, the optical separating/combining units E1 and E2 pass through the monitor signals λc1 and λc2 similarly to the optical separating/combining units 41, 42, 43 and 44 shown in FIG. 2. Therefore, it is possible to monitor transmission paths without increase the number of wavelengths for monitor signals.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

What is claimed is:

1. A transmission path monitoring system comprising:

A station;
B station;
C1 station;
C2 station; and
optical separating/combining section;
said A station, said B station, said C1 station and said C2 station are connected to said optical separating/combining section via optical fibers for the transmission paths, respectively,
wherein said optical fibers comprises:
a first main optical transmission path wherein a first wavelength division multiplexing signal that is transmitted from said A station to said B station is transmitted;

a first add optical transmission path wherein a first add signal that is transmitted from said C2 station to said first main optical transmission path is transmitted;

a first drop optical transmission path wherein a first drop signal that is dropped from said first main optical transmission path to said C1 station;

a first monitor signal optical transmission path which connects said first add optical transmission path to said first drop optical transmission path;

a second main optical transmission path wherein a second wavelength division multiplexing signal that is transmitted from said B station to said A station is transmitted;

a second add transmission path wherein a second add signal that is transmitted from said C1 station to said second main optical transmission path are transmitted;

a second drop optical transmission path wherein a second drop signal that is dropped from said second main optical transmission path to said C2 station;

a second monitor signal optical transmission path which connects said second add optical transmission path to said second drop optical transmission path, wherein said optical separating/combining section comprises:

a first adding unit; and a first dropping unit;

wherein said first adding unit comprises:

a separating unit configured to separate the monitor signal and the first add signal from a signal transmitted on said first add transmission path and allow the separated monitor signal to be transmitted on said first monitor signal optical transmission path; and a combining unit configured to combine the first add signal separated by said separating unit with the first wavelength division multiplexing signal, and said first dropping unit comprises:

a separating unit configured to separate the first drop signal from the first wavelength division multiplexing signal; and a combining unit configured to combine the monitor signal transferred by said first monitor signal optical transmission path with the first drop signal separated by said separating unit and allow the combination signal to be transmitted on said first drop optical transmission path.

2. A transmission path monitoring system comprising:

A station;

B station;

C1 station;

C2 station; and optical separating/combining section;

said A station, said B station, said C1 station and said C2 station are connected to said optical separating/combining section via optical fibers for the transmission paths, respectively, wherein said optical fibers comprises:

a first main optical transmission path wherein a first wavelength division multiplexing signal that is transmitted from said A station to said B station is transmitted;

a first add optical transmission path wherein a first add signal that is transmitted from said C2 station to said first main optical transmission path is transmitted;

a first drop optical transmission path wherein a first drop signal that is dropped from said first main optical transmission path to said C1 station;

a first monitor signal optical transmission path which connects said first add optical transmission path to said first drop optical transmission path;

a second main optical transmission path wherein a second wavelength division multiplexing signal that is transmitted from said B station to said A station is transmitted;

a second add transmission path wherein a second add signal that is transmitted from said C1 station to said second main optical transmission path are transmitted;

a second drop optical transmission path wherein a second drop signal that is dropped from said second main optical transmission path to said C2 station;

a second monitor signal optical transmission path which connects said second add optical transmission path to said second drop optical transmission path, wherein said optical separating/combining section comprises:

a second adding unit; and a second dropping unit;

wherein said second adding unit comprises:

a separating unit configured to separate the monitor signal and the second add signal from a signal transmitted on said second add transmission path and allow the separated monitor signal to be transmitted on said second monitor signal optical transmission path; and a combining unit configured to combine the second add signal separated by said separating unit with the second wavelength division multiplexing signal, and said second dropping unit comprises:

a separating unit configured to separate the second drop signal from the second wavelength division multiplexing signal; and a combining unit configured to combine the monitor signal transferred by said second monitor signal optical transmission path with the second drop signal separated by said separating unit and allow the combination signal to be transmitted on said second drop optical transmission path.

3. A transmission path monitoring system comprising:

A station;

B station;

C1 station;

C2 station; and optical separating/combining section;

said A station, said B station, said C1 station and said C2 station are connected to said optical separating/combining section via optical fibers for the transmission paths, respectively, wherein said optical fibers comprises:

a first main optical transmission path wherein a first wavelength division multiplexing signal that is transmitted from said A station to said B station is transmitted;

a first add optical transmission path wherein a first add signal that is transmitted from said C2 station to said first main optical transmission path is transmitted;

a first drop optical transmission path wherein a first drop signal that is dropped from said first main optical transmission path to said C1 station;

a first monitor signal optical transmission path which connects said first add optical transmission path to said first drop optical transmission path;

a second main optical transmission path wherein a second wavelength division multiplexing signal that is transmitted from said B station to said A station is transmitted;

a second add transmission path wherein a second add signal that is transmitted from said C1 station to said second main optical transmission path are transmitted;

a second drop optical transmission path wherein a second drop signal that is dropped from said second main optical transmission path to said C2 station;

a second monitor signal optical transmission path which connects said second add optical transmission path to said second drop optical transmission path, wherein said optical separating/combining section comprises:

a first adding unit; and a first dropping unit;

wherein said first adding unit comprises:

a combining unit configured to combine the monitor signal and the first add signal transmitted on said first add optical transmission path with the first wavelength division multiplexing signal; and a separating unit configured to separate the monitor signal from the combination signal by said combining unit and allow the separated monitor signal to be transmitted on said first monitor signal optical transmission path, and said first dropping unit comprises:

a combining unit configured to combine the monitor signal passed by said first monitor signal optical transmission path with the first wavelength division multiplexing signal; and a separating unit configured to separate the first drop signal and the monitor signal from the combination signal by said combining unit and allow the separated first drop signal and the separated monitor signal to be transmitted on said first drop optical transmission path.

4. A transmission path monitoring system comprising:

A station;

B station;

C1 station;

C2 station; and optical separating/combining section;

said A station, said B station, said C1 station and said C2 station are connected to said optical separating/combining section via optical fibers for the transmission paths, respectively, wherein said optical fibers comprises:

a first main optical transmission path wherein a first wavelength division multiplexing signal that is transmitted from said A station to said B station is transmitted;

a first add optical transmission path wherein a first add signal that is transmitted from said C2 station to said first main optical transmission path is transmitted;

a first drop optical transmission path wherein a first drop signal that is dropped from said first main optical transmission path to said C1 station;

a first monitor signal optical transmission path which connects said first add optical transmission path to said first drop optical transmission path;

a second main optical transmission path wherein a second wavelength division multiplexing signal that is transmitted from said B station to said A station is transmitted;

a second add transmission path wherein a second add signal that is transmitted from said C1 station to said second main optical transmission path are transmitted;

a second drop optical transmission path wherein a second drop signal that is dropped from said second main optical transmission path to said C2 station;

a second monitor signal optical transmission path which connects said second add optical transmission path to said second drop optical transmission path, wherein said optical separating/combining section comprises:

a second adding unit; and a second dropping unit;

wherein said second adding unit comprises:

a combining unit configured to combine the monitor signal and the second add signal transmitted on said second add optical transmission path with the second wavelength division multiplexing signal; and a separating unit configured to separate the monitor signal from the combination signal by said combining unit and allow the separated monitor signal to be transmitted on said second monitor signal optical transmission path, and said second dropping unit comprises:

an combining unit configured to combine the monitor signal passed by said second monitor signal optical transmission path with the second wavelength division multiplexing signal; and an separating unit configured to separate the second drop signal and the monitor signal from the combination signal by combining unit and allow the separated monitor signal and the separated second drop signal to be transmitted on said second drop optical transmission path.

5. The transmission path monitoring system according to claim 1, further comprising:

optical loopback circuits which are inserted between said optical separating/combining section and said A station, and between said optical separating/combining section and said B station, and between said optical separating/combining section and said C1 station, and between said optical separating/combining section and said C2 station.

6. The transmission path monitoring system according to claim 2, further comprising:

optical loopback circuits which are inserted between said optical separating/combining section and said A station, and between said optical separating/combining section and said B station, and between said optical separating/combining section and said C1 station, and between said optical separating/combining section and said C2 station.

7. The transmission path monitoring system according to claim 3, further comprising:

optical loopback circuits which are inserted between said optical separating/combining section and said A station, and between said optical separating/combining section and said B station, and between said optical separating/combining section and said C1 station, and between said optical separating/combining section and said C2 station.

8. The transmission path monitoring system according to claim 4, further comprising:

optical loopback circuits which are inserted between said optical separating/combining section and said A station, and between said optical separating/combining section and said B station, and between said optical separating/combining section and said C1 station, and between said optical separating/combining section and said C2 station.

* * * * *